United States Patent
Han et al.

(10) Patent No.: US 9,442,335 B2
(45) Date of Patent: Sep. 13, 2016

(54) DISPLAY MODULE HAVING INSULATION PORTION AT FRONT FRAME AND DISPLAY DEVICE HAVING THE SAME

(71) Applicant: Shenzhen China Star Optoelectronics Technology Co., Ltd., Shenzhen, Guangdong (CN)

(72) Inventors: Bing Han, Shenzhen (CN); Shih-hsun Lo, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 270 days.

(21) Appl. No.: 13/985,672

(22) PCT Filed: Jun. 27, 2013

(86) PCT No.: PCT/CN2013/078155
§ 371 (c)(1),
(2) Date: Aug. 15, 2013

(87) PCT Pub. No.: WO2014/187006
PCT Pub. Date: Nov. 27, 2014

(65) Prior Publication Data
US 2014/0347593 A1   Nov. 27, 2014

(30) Foreign Application Priority Data

May 24, 2013   (CN) .................. 2013 1 01985788

(51) Int. Cl.
G02F 1/1345   (2006.01)
G02F 1/13     (2006.01)
G02F 1/1333   (2006.01)

(52) U.S. Cl.
CPC ......... *G02F 1/13458* (2013.01); *G02F 1/1309* (2013.01); *G02F 1/13452* (2013.01); *G02F 2001/13332* (2013.01)

(58) Field of Classification Search
CPC combination set(s) only.
See application file for complete search history.

(56) References Cited

U.S. PATENT DOCUMENTS

2006/0119760 A1 *   6/2006   Okuda ................ G02F 1/13452
                                              349/58

FOREIGN PATENT DOCUMENTS

CN   102365670 A   2/2012

* cited by examiner

*Primary Examiner* — Lauren Nguyen
(74) *Attorney, Agent, or Firm* — Andrew C. Cheng

(57) ABSTRACT

A display module and a display device are provided. The display module includes a display panel and a front frame. The display panel includes a display region and a non-display region both located at a side of a light emitting surface, wherein the non-display region disposed at a peripheral area of the display panel and provided with a test pad electrically connected to wiring a of the display region. The front frame includes a front plate disposed opposite to at least a portion of the non-display region, and having an electric conduction portion for conducting away a current and an insulation portion for insulating the electric conduction portion from the test pad on the display panel. The present invention can avoid LCD screen noise and flicker because the test pad of the display panel contact with the front frame.

7 Claims, 3 Drawing Sheets

DISPLAY MODULE HAVING INSULATION PORTION AT FRONT FRAME AND DISPLAY DEVICE HAVING THE SAME

BACKGROUND OF THE INVENTION

1. Field of the Invention

The present invention relates to the display field, and more particularly to a display module and a display device.

2. Description of Related Art

The Liquid Crystal Display (LCD) has high display quality, small size, light weight and wide application ranges, etc. The LCD is widely applied in mobile phones, laptop computers, televisions and other electronic products. The liquid crystal display panel is the most important element of the LCD, which typically comprises an array substrate, a color filter (CF) substrate, and a liquid crystal layer which is interposed between the two substrates. Through controlling the voltage between the CF substrate and the array substrate, it drives liquid crystal molecules in the liquid crystal layer to be deflected in different display screens.

Wherein, the array substrate is provided with a plurality of scan lines, a plurality of data lines and a plurality of pixel electrodes arranged in a matrix, thin-film transistors (TFTs), and a first common electrode. The CF substrate is provided with a second common electrode. In the LCD cell process, it usually utilizes a shorting bar to perform a lighting test so as to test the yield of the LCD panel.

With reference to FIG. 1, in a non-display region 114 of the array substrate 111, it is typically provided with seven shorting bars 111, and two of them are respectively and electrically connect to odd-numbered data lines 1112 and even data line 1113 on the array substrate 111. Three of them are respectively and electrically connected to a red pixel, a green pixel and a blue pixel scan lines 1114 of the array substrate 111. The remaining one of them is electrically connected to a first common electrode 1115 of the array substrate 111, and the other remaining one is electrically connected to the second common electrode 1121 through the CF substrate 112. Two ends of the shorting bar 1111 are provided with test pads 1117. Under the lighting test, inputting test signals to the data lines, scan lines, or the common electrode which are electrically connected to the corresponding shorting bar 1111 through the test pads 1117 to test a screen of the LCD panel 110. When the testing is completed, utilizing the grinding or the laser cutting to disconnect the connection between the shorting bar 1111 and the scan lines, data lines or the common electrodes.

In the LCD panel 110, a first test pad 1118 which is electrically connected to the first common electrode 1115 of the array substrate 1111 and a second test pad 1119 which is electrically connected to a second common electrode 1121 of the CF substrate 112. The two test pads are farther apart from the other test pads 1117. When utilizing the laser cutting, the cutting region AA' of the laser cutting is limited. It is often occurred that the first test pad 1118 and the second test pad 1119 are not in the cutting region AA'. Therefore, even after performing the laser cutting, the first test pad 1118 is still electrically connected to the first common electrode 1115 and/or the second test pad 1119 is still electrically connected to the second common electrode 1121.

Please continue to refer to FIG. 2, in the conventional LCD, the front frame 120 is generally a non-metal material, but in order to prevent a current flowing through the LCD panel 110 in the Electro-Static discharge (ESD) testing, it often attaches an electrically conductive film 121 at the inner side of the front frame 120. The electrically conductive film 121 contacts with the backplane 130 which is grounded to ensure that the front frame 120 is also grounded (GND). If it over presses the front frame 120 in the assembly process of the LCD panel 110 and the front frame 120, it may cause a deformation of the front frame 120 such that the electrically conductive film 121 of the front frame 120 may contact the test pads 1117 of the LCD panel 110 (as shown in FIG. 3). Or, it may cause electrically conductive film 121 of the front frame 120 to tilt up such that it contacts with the test pad contacts 1117 of the LCD panel 110 (as shown in FIG. 4).

In the above situation, if the first test pad 1118 which is still connected with the first common electrode 1115 and/or the second test pad 1119 which is still connected with the second common electrode 1121 connect to the electrically conductive film 121 of the front frame 120, the potential of the first common electrode 1115 and/or the second common electrode 1121 is GND. Therefore, it disturbs the reference base of digital signal of the driver IC so as to occur a malfunction, that is, it generates the LCD screen noise or flicker.

SUMMARY OF THE INVENTION

The main object of the present invention is to provide a display module and a display device. They can reduce LCD screen noise or flicker phenomenon because the test pads of the display panel contact with the front frame.

In order to solve the above technical problems, a technical solution provided by the present invention is: a display module comprising: a display panel including a display region and a non-display region both located at a side of a light emitting surface, wherein, the non-display region disposed at a peripheral area of the display panel and provided with test pads electrically connected to wirings of the display region, wherein, the test pads includes a first test pad and a second test pad; a first substrate provided with a first common electrode and a first wiring electrically connected to the first common electrode inside the display region, wherein, the first wiring electrically connects to the first test pad; and a second substrate disposed opposite to the first substrate and provided with a second common electrode and a second wiring electrically connected to the second common electrode, wherein the second wiring electrically connects to the second test pad; and a front frame including a front plate disposed opposite to at least a portion of the non-display region, and having a first insulation layer stacked disposition and an electrically conductive film for conducting away a current, wherein, the electrically conductive film disposes at a side of the front plate adjacent to the non-display region, and an area of the electrically conductive film right opposite to the first and second test pads is hollowed out such that when the front plate contacts with the non-display region of the display panel under an external force, the electrically conductive film cannot contact with the first and second test pads so as to insulate the electrically conductive film from the first and second test pads on the display panel.

Wherein, the display module further comprises a backlight module, and the backlight module includes a backplane electrically connected to at least a portion of the electrically conductive film of the front frame to conduct away the current of the front frame.

In order to solve the above technical problems, another technical solution provided by the present invention is: a display module comprising: a display panel including a display region and a non-display region both located at a side of a light emitting surface, wherein, the non-display region disposed at a peripheral area of the display panel and provided with a test pad electrically connected to wiring of a of the display region; and a front frame including a front plate disposed opposite to at least a portion of the non-display region, and having an electric conduction portion for conducting away a current and an insulation portion for insulating the electric conduction portion from the test pad on the display panel.

Wherein, the front plate includes a first insulation layer stacked disposition and an electrically conductive film as the electric conduction portion wherein, the electrically conductive film disposes at a side of the front plate adjacent to the non-display region, and an area of the electrically conductive film right opposite to the test pad is hollowed out such that when the front plate contacts with the non-display region of the display panel under an external force, the electrically conductive film cannot contact with the test pad to form the insulation portion for insulating the electric conduction portion from the test pad on the display panel.

Wherein, the front plate includes a first insulation layer stacked disposition and an electrically conductive film as the electric conduction portion, wherein, the electrically conductive film disposes at a side of the front plate adjacent to the non-display region, and an area of an outer surface of the electrically conductive film right opposite to the test pad provides with a second insulation layer such that when the front plate contacts with the non-display region of the display panel under an external force, the electrically conductive film cannot contact with the test pad to form the insulation portion for insulating the electric conduction portion from the test pad on the display panel.

Wherein, the front plate is an electrically conductive plate, and an area of an outer surface of the electrically conductive plate right opposite to the test pad provides with a second insulation layer such that when the front plate contacts with the non-display region of the display panel under an external force, the front plate cannot contact with the test pad to form the insulation portion for insulating the electric conduction portion from the test pad on the display panel.

Wherein, the test pad includes a first test pad and a second test pad, and the display panel comprises: a first substrate provided with a first common electrode and a first wiring electrically connected to the first common electrode inside the display region, wherein, the first wiring electrically connects to the first test pad; and a second substrate disposed opposite to the first substrate and provided with a second common electrode and a second wiring electrically connected to the second common electrode, wherein the second wiring electrically connects to the second test pad; wherein, the insulation portion of the front frame is disposed right opposite to the first and second test pads on the display panel so as to insulate the electric conduction portion from the first and second test pads.

Wherein, the display module further comprises a backlight module, and the backlight module includes a backplane electrically connected to at least a portion of the electric conduction portion of the front frame to conduct away the current of the front frame.

In order to solve the above technical problems, another technical solution provided by the present invention is: a display device comprising a display module including a display panel including a display region and a non-display region both located at a side of a light emitting surface, wherein, the non-display region disposed at a peripheral area of the display panel and provided with a test pad electrically connected to a wiring of the display region; and a front frame including a front plate disposed opposite to at least a portion of the non-display region, and the front plate includes an electric conduction portion for conducting away a current and an insulation portion for insulating the electric conduction portion from the test pad on the display panel.

Wherein, the front plate includes a first insulation layer stacked disposition and an electrically conductive film as the electric conduction portion wherein, the electrically conductive film disposes at a side of the front plate adjacent to the non-display region, and an area of the electrically conductive film right opposite to the test pad is hollowed out such that when the front plate contacts with the non-display region of the display panel under an external force, the electrically conductive film cannot contact with the test pad to form the insulation portion for insulating the electric conduction portion from the test pad on the display panel.

Wherein, the front plate includes a first insulation layer stacked disposition and an electrically conductive film as the electric conduction portion, wherein, the electrically conductive film disposes at a side of the front plate adjacent to the non-display region, and an area of an outer surface of the electrically conductive film right opposite to the test pad provides with a second insulation layer such that when the front plate contacts with the non-display region of the display panel under an external force, the electrically conductive film cannot contact with the test pad to form the insulation portion for insulating the electric conduction portion from the test pad on the display panel.

Wherein, the front plate is an electrically conductive plate, and an area of an outer surface of the electrically conductive plate right opposite to the test pad provides with a second insulation layer such that when the front plate contacts with the non-display region of the display panel under an external force, the front plate cannot contact with the test pad to form the insulation portion for insulating the electric conduction portion from the test pad on the display panel.

Wherein, the test pad includes a first test pad and a second test pad, and the display panel comprises: a first substrate provided with a first common electrode and a first wiring electrically connected to the first common electrode inside the display region, wherein, the first wiring electrically connects to the first test pad; and a second substrate disposed opposite to the first substrate and provided with a second common electrode and a second wiring electrically connected to the second common electrode, wherein the second wiring electrically connects to the second test pad; wherein, the insulation portion of the front frame is disposed right opposite to the first and second test pads on the display panel so as to insulate the electric conduction portion from the first and second test pads.

Wherein, the display module further comprises a backlight module, and the backlight module includes a backplane electrically connected to at least a portion of the electric conduction portion of the front frame to conduct away the current of the front frame.

Comparing to the prior art, the present disposes an insulation portion at the front plate such that the insulation portion insulates the electric conduction portion from the test pads which are electrically connected to the wirings of the display region of the display panel. Therefore, it can prevent that when the test pads of the display panel contacts with the front plate, the test pads of the display panel electrically connect to the electric conduction portion of the front plate. Thus, it avoids the wirings of the display region of the display panel occurring the ground, that is, avoids LCD screen noise or flicker because the test pads of the non-display region of the display panel contact with the front frame.

DETAILED DESCRIPTION OF THE PREFERRED EMBODIMENT

The following content combines with the drawings and the embodiment for describing the present invention in detail.

Figure 5:
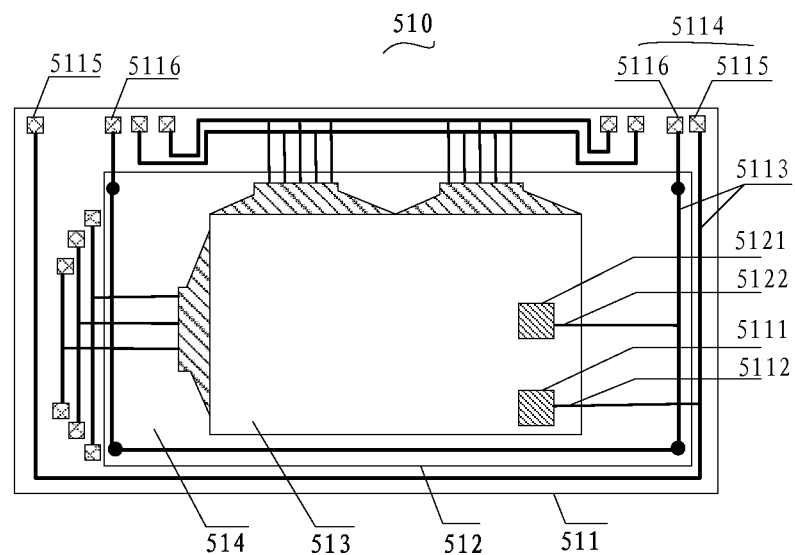
FIG. 5 is schematic planar view of a display panel of a display module according to an embodiment of the present invention.
Figure 6:
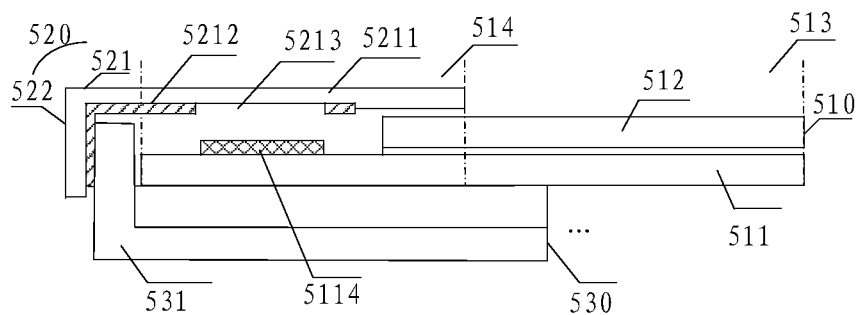
FIG. 6 is schematic cross-sectional view of a display panel of a display module according to an embodiment of the present invention.

With reference to FIG. 5 and FIG. 6, wherein, FIG. 5 is schematic planar view of a display panel of a display module according to an embodiment of the present invention and FIG. 6 is schematic cross-sectional view of a display panel of a display module according to an embodiment of the present invention. In the present embodiment, the display module includes a display panel 510, a front frame 520 and a backlight module 530. The display panel 510 includes a display region 513 and a non-display region 514 which are both located at a side of a light emitting surface. The non-display region 514 is disposed at a peripheral area of the display panel 510. The front frame 520 disposed at the non-display region 514 of the display panel 510. The backlight module 530 is disposed at a side of a light entering surface of the display panel 510.

Figure 1:
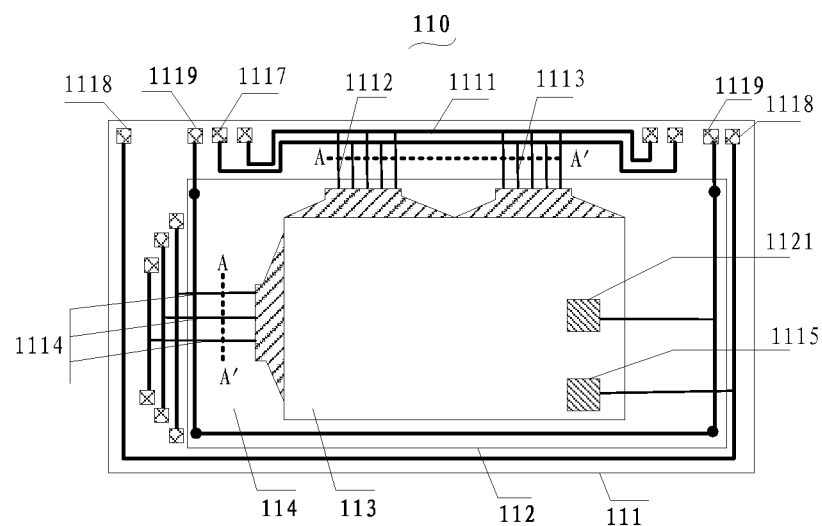
FIG. 1 is schematic planar view of a display panel of a display module in the prior art.
Figure 2:
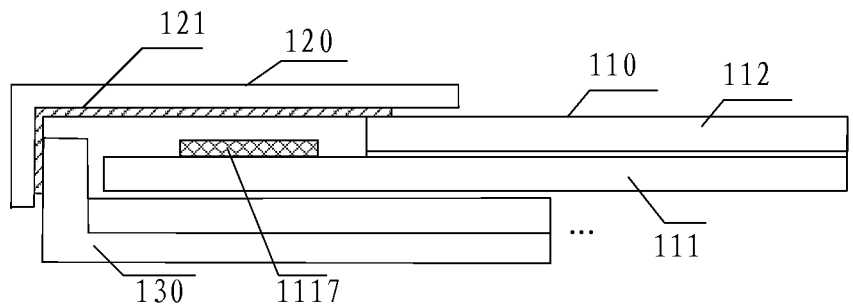
FIG. 2 is schematic cross-sectional view of a display panel of a display module in the prior art.
Figure 3:
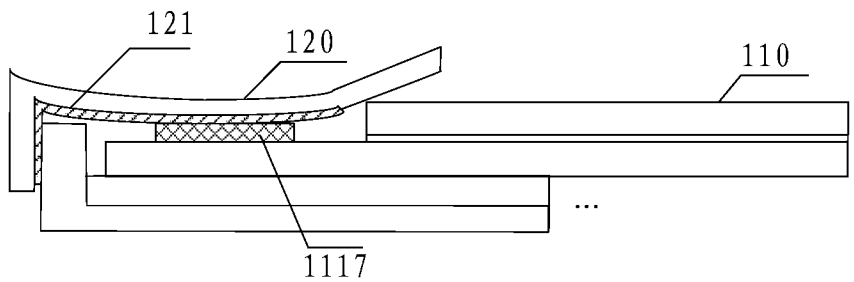
FIG. 3 is schematic cross-sectional view of a display panel of a display module after a deformation of a front frame in the prior art.
Figure 4:
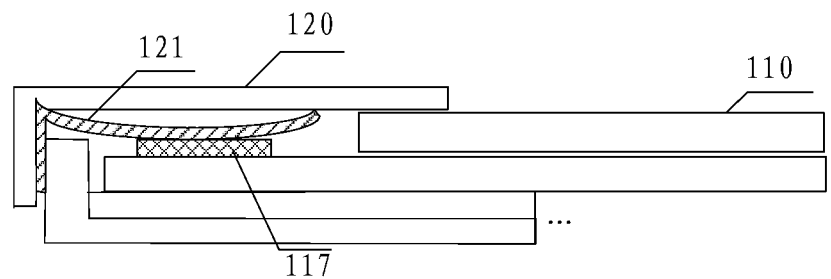
FIG. 4 is schematic cross-sectional view of a display panel of a display module after an electrically conductive film is peeling off in the prior art.

The display panel 510 includes a first substrate 511 and a second substrate 512 disposed opposite to the first substrate 511. Corresponding to the display region 513, the first substrate 511 is at least provided with a first common electrode 5111 and a first wiring 5112 electrically connected to the first common electrode 5111. The second substrate 512 is at least provided with a second common electrode 5121 and a second wiring 5122 electrically connected to the second common electrode 5121 (In FIG. 5, for convenience only, it schematically shown the first and the second common electrodes. In practice, the disposition of the first and second common electrodes in the display region may be different from that shown in FIG. 5. The aforementioned FIG. 1 is also the same)

The common electrodes may provide reference potentials for the corresponding substrates. Corresponding to the non-display region 514, the first substrate 511 is provided with a shorting bar 5113 for testing the display region 513 and a test pads 5114 disposed at one end of the shorting bar 5113. Wherein, in the testing, the shorting bar 5113 is electrically connected to a wiring of the display region 513 of the display panel 510. The test pad 5114 is disposed for facilitating the shorting bar 5113 to input a test signal in the testing. In the present embodiment, the test pad 5114 is a metal pad. I can be understand that the test pads are not limited to dispose at the ends of the shorting bars, the test pads can be disposed at any positions of the shorting bars, and the present invention does not limit on this.

In the present embodiment, the shorting bar 5113 includes at least the shorting bars respectively and electrically connected to the first wiring 5112, and the second wiring 5122. Correspondingly, the test pads 5114 includes at least test pads that are respectively and electrically connected to the first wiring 5112 and the second wiring 5122. For convenience of description, one of the test pads 5114 electrically connected to the first wiring 5112 is defined as a first test pad 5115, and one of the test pads 5114 electrically connected to the second wiring 5114 is defined as a second test pad 5116.

The front frame 520 includes a front plate 521 disposed opposite to at least a portion of the non-display region 514 and a side plate 522. The backlight module 530 includes a backplane 531 which contacts with a portion of the side plate 522 of the front frame portion 520, wherein the backplane 531 may be grounded. The front plate 521 and side plate 522 further includes a first insulation layer 5211 which is stacked disposition and an electrically conductive film 5212 as an electric conduction portion. The electrically conductive film 5212 is disposed at the front plate 521 and side plate 522 adjacent to a side of the non-display region 514 of the display panel 510, and a portion of the electrically conductive film 5212 is electrically connected to the backplane 531 so as to conduct a current of the front frame 520 to the backplane 531 which is grounded. In the present embodiment, the first insulation layer 5211 is made of a plastic material. Of course, the first insulation layer is not limited to the plastic material. In another embodiment, the first insulation layer may be made of other insulation materials such as an insulation paint or a rubber.

In the display module, a portion of the electrically conductive film 5212 of the front plate 521 disposes opposite to the test pads 5114 of the display panel 510. The front plate 521 further includes an insulation portion 5213 for insulating the electrically conductive film 5212 from the test pads 5114 on the display panel 510. In the present embodiment, an area of the electrically conductive film 5212 right opposite to the test pads 5114 is hollowed out such that when the front plate 521 contacts with the non-display region 514 of the display panel 510 under an external force, the electrically conductive film 5212 cannot contact with the test pads 5114 to form the insulation portion 5213 for insulating the electrically conductive film 5212 from the test pads 5114 on the display panel 510.

For example, an area of the hollow-out portion is larger than the test pads 5114. Of course, in another embodiment, the electrically conductive film can be hollowed out at an area right opposite to the test pads. The hollow-out portion can make a portion of the electrically conductive film right opposite to the test pads and a portion of the electrically conductive film not right opposite to the test pads become insulation to form the insulation portion 5213 for insulating a portion of the electrically conductive film 5212 connected to the backplane from the test pads 5114 on the display panel 510.

It should be noted that, in this embodiment, the test pads mentioned are only the first test pad and the second test pad. But the display module of the present invention may further include a shorting bar electrically connected to the scan line for testing the scan line and/or a shorting bar electrically connected to the data line for testing the data line, and test pads disposed in the shorting bars. The insulation portion of the front frame may only make an insulation between the electrically conductive film and the first and second test pads or make an insulation between the electrically conductive film and the first test pad, the second test pad, and the above-mentioned test pads on the display panel.

Furthermore, in the display panel of the present embodiment, the first and second test pads are disposed at a region farther away from the other test pads so that the first and second test pads may still connect to the first and second common electrodes after testing the display panel. Therefore, in the present embodiment, the insulation portion is at least configured to insulate the electrically conductive film from the first and second test pads.

But in other embodiments for other types of display module, the above condition is not used for the first and second test pads for testing the first and second common electrodes. Corresponding to that display module, the insulation portion is for insulating the electrically conductive film from the other test pads connected to the wirings of the display region of that display module. Furthermore, the display module of the present invention may not include the shorting bars, and the test pads are other test pads which are not disposed at the shorting bars. Therefore, it does not limit the test pads here. The test pads of the present invention are arbitrary test pads which are disposed in the non-display region and electrically connected to the wiring of the display region.

Furthermore, the display module of the present invention is not limited to a structure that provides with the backlight module and conducting away the current at the front frame by the backplane of the backlight module. In another embodiment, the present invention may not provide with the backlight module. The display module may provide with other ground configurations. The front frame and one of the other structures electrically connected to the ground can conduct the current away. Or, the display module provides with a backlight module and other ground structure, and the front frame is electrically connected to other structure which is grounded to conduct away the current. Therefore, the backlight module of the display module and the way which conducts away the current at the front frame are not used for limiting the present invention.

In the present embodiment, the first and second test pads of the display module are easily still electrically connected to the wirings of the display region after the testing. By hollowing out the electrically conductive film of the front plate right opposite to the first and second test pads, it is insulated between the electrically conductive film and the first and second test pads. Therefore, it avoids that when the electric conduction portion of the front frame contacts with the test pads, the wirings in the display region are grounded. As a result, it avoids that screen noise and flicker of the LCD because of the test pads in the non-display region of the display panel contacting with the front frame.

Figure 7:
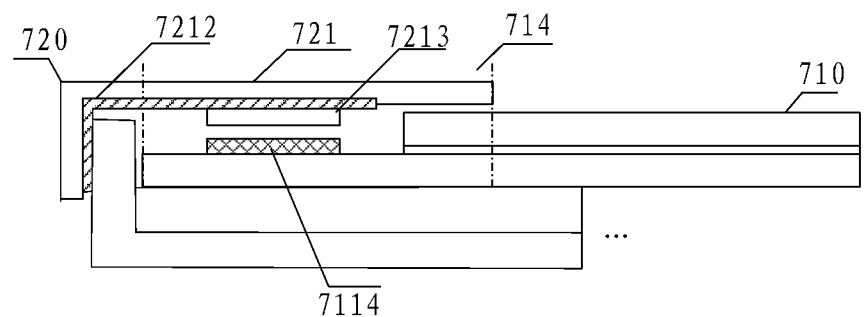
FIG. 7 is schematic cross-sectional view of a display panel of a display module according to another embodiment of the present invention.

With reference to FIG. 7, FIG. 7 is schematic cross-sectional view of a display panel of a display module according to another embodiment of the present invention. The display module of this embodiment is basically the same with the display module of the foregoing embodiment. The difference is that an electrically conductive film 7212 of a front frame 720 is not a hollow-out structure. The electrically conductive film 7212 is disposed at a side of the front frame 720 adjacent to the non-display region 714 of the display panel 710. An area of an outer surface of the electrically conductive film 7212 right opposite to test pads 7114 of the display panel 710 is disposed with a second insulation layer 7213 such that when a front plate 721 of the front frame 720 contacts with the non-display region 710 of the display panel 714 under an external force, the electrically conductive film 7212 does not contact with the test pads 7114 to form an insulation portion between the electrically conductive film 7212 and the test pads 7114 of the display panel 710. In the present embodiment, the second insulation layer 7213 is an insulating tape. Of course, the second insulation layer is not limited to the insulating tape. In another embodiment, the second insulation layer may also be constituted by other insulating materials such as an insulation paint or a rubber.

Figure 8:
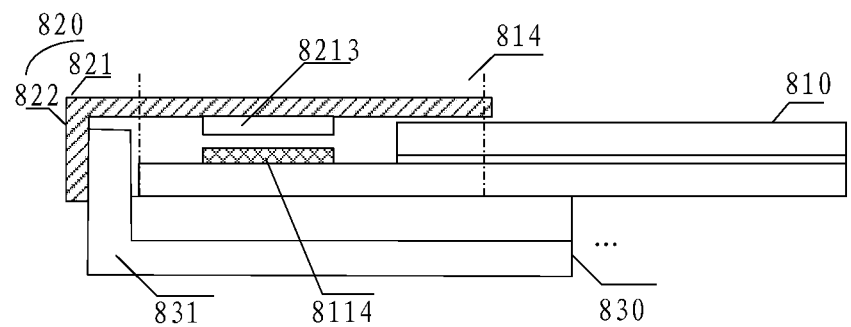
FIG. 8 is schematic cross-sectional view of a display panel of a display module according to another embodiment of the present invention.

With reference to FIG. 8, FIG. 8 is schematic cross-sectional view of a display panel of a display module according to another embodiment of the present invention. The display module of this embodiment is basically the same with the display module of the foregoing embodiment. The difference is that a front frame 820 is not provided with the first insulation layer and the electrically conductive film. A front plate 821 and a side plate 822 of the front frame 820 are both electrically conductive plates so that the entire front frame 820 is as an electric conduction portion. The side plate 822 of the front frame 820 contacts with a backplane 831 of the backlight module 830 so as to achieve an electric connection for conducting away a current at the front frame 820. An area of an outer surface of the front plate 821 of the front frame 820 right opposite to the test pads 8114 of the non-display region 814 of the display panel 810 is provided with a second insulation layer 8213 such that when the front plate 821 contacts with the non-display region 814 of the display panel 810 under an external force, the front plate 821 cannot contact with the test pads 8114 of the non-display region 814 to form the insulation portion between the front plate 821 and the test pads 8114 on the display panel 810.

It should be noted that in the foregoing embodiments, the display modules are all LCD modules, but it does not limit the present invention to be the LCD modules. The display module of the present invention may be other modules that provide with test pads which electrically connect to wirings of the display region in the non-display region, and a front frame provides with a conductive structure such as an Organic Electroluminescence Display (OELD) module or a plasma module, etc.

Figure 9:
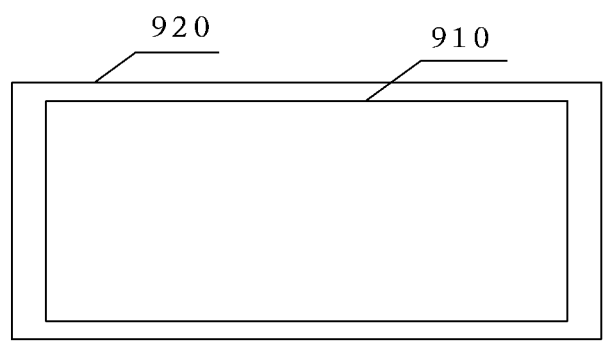
FIG. 9 is schematic planar view of a display device according to an embodiment of the present invention.

With reference to FIG. 9, it is schematic planar view of a display device according to an embodiment of the present invention. In the present embodiment, the display device includes a display module 910 and an outer housing 920 disposed around the display module 910. Wherein, the display module 910 is one of the display modules shown in the foregoing embodiments. Its specific description can refer to FIGS. 5 to 8, and the description in the foregoing embodiments, it does not repeat here again.

Comparing to the prior art, the present disposes an insulation portion at the front plate such that the insulation portion insulates the electric conduction portion from the test pads which are electrically connected to the wirings of the display region of the display panel. Therefore, it can prevent that when the test pads of the display panel contacts with the front plate, the test pads of the display panel electrically connect to the electric conduction portion of the front plate. Thus, it avoids the wirings of the display region of the display panel occurring the ground, that is, avoids LCD screen noise or flicker because the test pads of the non-display region of the display panel contact with the front frame.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A display module comprising:
   a display panel including:
      a display region and a non-display region both located at a side of a light emitting surface, wherein, the non-display region disposed at a peripheral area of the display panel and provided with test pads electrically connected to wirings of the display region, wherein, the test pads includes a first test pad and a second test pad;
      a first substrate provided with a first common electrode and a first wiring electrically connected to the first common electrode inside the display region, wherein, the first wiring electrically connects to the first test pad; and
      a second substrate disposed opposite to the first substrate and provided with a second common electrode and a second wiring electrically connected to the second common electrode, wherein the second wiring electrically connects to the second test pad; and
   a front frame including:
      a front plate disposed opposite to at least a portion of the non-display region, and having:
         a first insulation layer stacked disposition;
         an electrically conductive film for conducting away a current, wherein, the electrically conductive film disposes at a side of the front plate adjacent to the non-display region; and
         an opening formed through the electrically conductive film and aligned to the first and second test pads to reveal the first insulation layer such that the revealed first insulation layer is directly aligned to the first and second test pads, wherein, when the front plate contacts with the non-display region of the display panel under an external force, the electrically conductive film cannot contact with the first and second test pads so as to insulate the electrically conductive film from the first and second test pads on the display panel.

2. The display module according to claim 1, wherein, the display module further comprises a backlight module and the backlight module includes a backplane electrically connected to at least a portion of the electrically conductive film of the front frame to conduct away the current of the front frame.

3. A display module comprising:
   a display panel including:
      a display region and a non-display region both located at a side of a light emitting surface, wherein, the non-display region disposed at a peripheral area of the display panel and provided with a test pad electrically connected to wiring a of the display region; and
   a front frame including:
      a front plate disposed opposite to at least a portion of the non-display region, and having:
         a first insulation layer stacked disposition;
         an electrically conductive film for conducting away a current, wherein, the electrically conductive film disposes at a side of the front plate adjacent to the non-display region; and
         an opening formed through the electrically conductive film and aligned to the test pad to reveal the first insulation layer such that the revealed first insulation layer is directly aligned to the test pad for insulating the electrically conductive film from the test pad on the display panel.

4. The display module according to claim 3, wherein, the display module further comprises a backlight module, and the backlight module includes a backplane electrically connected to at least a portion of the electrically conductive film of the front frame to conduct away the current of the front frame.

5. A display device comprising
   a display module including:
      a display panel including a display region and a non-display region both located at a side of a light emitting surface, wherein, the non-display region disposed at a peripheral area of the display panel and provided with a test pad electrically connected to a wiring of the display region; and
   a front frame including:
      a front plate disposed opposite to at least a portion of the non-display region, and having:
         a first insulation layer stacked disposition;
         an electrically conductive film for conducting away a current, wherein, the electrically conductive film disposes at a side of the front plate adjacent to the non-display region; and
         an opening formed through the electrically conductive film and aligned to the test pad to reveal the first insulation layer such that the revealed first insulation layer is directly aligned to the test pad for insulating the electrically conductive film from the test pad on the display panel.

6. The display device according to claim 5, wherein, the test pad includes a first test pad and a second test pad, and the display panel comprises:
   a first substrate provided with a first common electrode and a first wiring electrically connected to the first common electrode inside the display region, wherein, the first wiring electrically connects to the first test pad; and
   a second substrate disposed opposite to the first substrate and provided with a second common electrode and a second wiring electrically connected to the second common electrode, wherein the second wiring electrically connects to the second test pad.

7. The display device according to claim 5, wherein, the display module further comprises a backlight module, and the backlight module includes a backplane electrically connected to at least a portion of the electrically conductive film of the front frame to conduct away the current of the front frame.

* * * * *